United States Patent
Pillai et al.

(10) Patent No.: US 8,901,212 B2
(45) Date of Patent: Dec. 2, 2014

(54) RECYCLED POLYMER AND BITUMEN COMPOSITE ASPHALT ADDITIVE

(76) Inventors: Chandrasekaran Ramayya Pillai, Pepper Pike, OH (US); Hari Chandra Chandrasekaran, Pepper Pike, OH (US)

(*) Notice: Subject to any disclaimer, the term of this patent is extended or adjusted under 35 U.S.C. 154(b) by 189 days.

(21) Appl. No.: 13/492,991

(22) Filed: Jun. 11, 2012

(65) Prior Publication Data

US 2013/0331485 A1    Dec. 12, 2013

(51) Int. Cl.
- *C08L 47/00*   (2006.01)
- *C08L 7/00*    (2006.01)
- *C08L 21/00*   (2006.01)
- *C08K 5/31*    (2006.01)
- *C08K 5/375*   (2006.01)
- *C08K 5/47*    (2006.01)

(52) U.S. Cl.
USPC .......................................................... 524/68

(58) Field of Classification Search
None
See application file for complete search history.

(56) References Cited

U.S. PATENT DOCUMENTS

2010/0308495 A1*  12/2010  Pillai et al. ............... 264/211.12

* cited by examiner

*Primary Examiner* — Ling Choi
*Assistant Examiner* — Catherine S Branch

(57) ABSTRACT

This invention provides a novel composite of bitumen and recycled polymers from post consumer and pre consumer manufacturing scraps for use in asphalt to increase its viscosity at higher temperature, desirable in pavements of warmer regions. This additive also improves tackiness for use in asphalt sealant applications and roofing membrane. This invention meets federal government objective of increasing post consumer wastes in asphalt.

10 Claims, No Drawings

RECYCLED POLYMER AND BITUMEN COMPOSITE ASPHALT ADDITIVE

FIELD OF THE INVENTION

This invention relates to asphalt products used in road surface paving, road crack sealants and roofing membranes, and is related to paving, sealant and insulation asphalt products that are mixed with addition of treated butyl and polyisoprene sourced from post consumer and pre consumer scraps, recycled or virgin polyethylene and polypropylene plastics and bitumen composites.

BACKGROUND TO THE INVENTION

Widespread use of asphalt based road pavements in place of concrete has lead to search for additives to prevent rutting and cracking of road surface over long term. Commonly used additive at present is Styrene Butadiene Styrene block copolymer (SBS). The high cost of SBS has resulted in many alternative products. Many of these alternative products are polymer based-some recycled rubbers mostly from used tire rubber in powder form for ease of dispersion.

Many other polymers have traditionally been used for improving the performance of asphalt. Among them are Natural Rubber (polyisoprene) and Butyl Rubber (Isobutylene-isoprene copolymer). These additives in small doses ranging from 3 to 10% in the asphalt improve resistance to rutting and cracking of asphalt bound aggregate pavements. Also it increases the softening point and viscosity of asphalt. With increasing cost of Natural and Butyl Rubbers, the addition of these rubbers in virgin form has escalated the cost of such treatment. The authors of this patent with background in development of devulcanized polymers have come up with a novel solution for use of post consumer Butyl rubber scraps and pre-consumer, post manufacturing waste polyisoprene as asphalt additive that would replace partly or fully virgin Butyl and polyiosprene rubbers. This not only makes more economical sense, but also meets the federal mandate to increase scrap rubber content in asphalt, thereby prevent these scraps from landfills.

Natural Rubber and synthetic Polyiosprene are used in many rubber products ranging from tires to rubber threads. Their post consumer wastes are mostly sent to landfills. In case of used tires, most of it is used in furnaces for boilers and kilns. Although they are burnt, the process produces emissions that are detrimental to the environment. Therefore their use in asphalt would be environment friendly.

Butyl Rubber bladders are extensively used in the manufacturing process of making tires. For every 100 tires a bladder weighing anywhere between 20 LB and 50 LB is discarded. They go to landfills at present. These can be used in the present invention as a component to produce asphalt additive.

A number of patents exist that use polymer additives to improve certain characteristics of asphalts. U.S. Pat. No. 6,214,908 uses a blend of polypropylene plastic resin, Styrene Butadiene Rubber and Calcium Carbonate mineral filler as an additive for asphalt. U.S. Pat. No. 5,801,204 describes use of liquid plastic as asphalt additive while U.S. Pat. No. 5,702,199 discloses the use granulated recycled plastic waste to replace or substitute some of the rock aggregate as component of asphalt additive for use in pavement.

None of above referenced patents discloses the use of post consumer butyl rubber, pre consumer polyiosprene and plastics resin blends as asphalt additives.

SUMMARY OF INVENTION

The present invention introduces use post consumer and factory waste rubbers that are blended with virgin or recycled plastics under controlled conditions to produce a composite that is suitable as low cost but effective asphalt additive to replace fully or partially higher cost additives like Styrene Butadiene Styrene block copolymers, virgin Natural Rubbers, synthetic Polyisoprene, Butyl Rubber and Styrene Butadiene Rubber.

In summary, ground powders of post consumer butyl rubber bladders, pre consumer polyisoprene scraps treated with peptizers in a closed chamber followed by blending them with a mixture of polyethylene, polypropylene and bitumen under controlled conditions and heated to 320° C. produces a composite that is cost effective asphalt additive.

Further objects and advantages of our invention will become apparent from a consideration of the process descriptions.

The following examples are provided merely to illustrate the present invention, and it is to be understood the invention is not limited thereto. All amounts of the various ingredients in the examples and elsewhere in the specification are by weight unless otherwise specified.

EXAMPLE 1

Asphalt Additive from Synthetic Polyisoprene Thread Rubber Scrap, Polypropylene and Polyethylene In the first stage, the synthetic Polyisoprene was broken down to powder using a refiner mill and mixed in a Banbury with 0.05 parts of 2,2'-dibenzamidodiphenyldisulfide per hundred parts of powdered synthetic Polyisoprene for 20 minutes until the temperature reached 120° C.

Stage 1 Composition

| Material | Parts |
| --- | --- |
| Synthetic Polyisoprene | 100 |
| 2,2'-dibenzamidodiphenyldisulfide | 0.05 |

The mix was then cooled and aged for 24 hours.

In stage 2, mixture of synthetic polyisoprene and 2,2'-dibenzamidodiphenyldisulfide (peptizer) was mixed with polyethylene and polypropylene in the ratio of 95:4:1 respectively for 10 minutes in an internal mixer at temperature of 230° C. The mix was then dumped onto to a two roll mill where 20 parts of Natural Rubber per hundred on the weight of the dumped mix was milled together to produce a uniform composite of asphalt additive in the form of sheets.

Stage 2 Composition

| Material | Parts |
| --- | --- |
| Mix of Polyisoprene and peptizer from stage 1 | 95 |
| Polyethylene | 4 |
| Polypropylene | 1 |
| After dumping mix on two roll mill, additional component | |
| Natural Rubber (NR) | 20 |

EXAMPLE 2

Asphalt Additive from Natural Rubber Rubber Band Scrap and Polyethylene

In the first stage, the Natural Rubber Glove was broken down to powder using a refiner mill and mixed in a Banbury with 0.05 parts of Dibenzothiazole disulfide per hundred parts of powdered NR glove powder for 20 minutes until the temperature reached 100° C.

Stage 1 Composition

| Material | Parts |
| --- | --- |
| Natural Rubber | 100 |
| Dibenzothiazole disulphide | 0.05 |

The mix was then cooled and aged for 24 hours.

In stage 2, mixture of synthetic polyisoprene and 2,2-dibenzamidodiphenyldisulfide (peptizer) was mixed with polyethylene and polypropylene in the ratio of 95:4:1 respectively for 10 minutes in an internal mixer at temperature of 230° C. The mix was then dumped onto to a two roll mill where 20 parts of Natural Rubber per hundred on the weight of the dumped mix was milled together to produce a uniform composite of asphalt additive in the form of sheets.

Stage 2 Composition

| Material | Parts |
| --- | --- |
| Mix of Natural Rubber and peptizer from stage 1 | 90 |
| Polyethylene | 10 |
| Polypropylene | 0 |
| After dumping mix on two roll mill, additional component | |
| Natural Rubber (NR) | 20 |

EXAMPLE 3

Asphalt Additive from Post Consumer Butyl Rubber Bladder Scrap, Polypropylene and Polyethylene In the first stage, the Butyl bladder was ground down to powder using a cryogenic grinding system at Advanced Cryogenics LLC, and the powder mixed in a Banbury with 0.05 parts of N,N'-diphenyl guanadine per hundred parts of powdered Butyl bladder powder for 20 minutes until the temperature reached 120° C.

Stage 1 Composition

| Material | Parts |
| --- | --- |
| Butyl Bladder | 100 |
| N,N'-diphenyl guanadine | 0.05 |

The mix was then cooled and aged for 24 hours.

In stage 2, mixture of Butyl bladder and N,N'-diphenyl guanadine (peptizer) was mixed with polyethylene and polypropylene in the ratio of 90:8:2 respectively for 10 minutes in an internal mixer at temperature of 230° C. The mix was then dumped onto to a two roll mill and sheeted out to produce an asphalt additive.

Stage 2 Composition

| Material | Parts |
| --- | --- |
| Mix of Butyl Bladder and peptizer from stage 1 | 90 |
| Polyethylene | 2 |
| Polypropylene | 8 |

EXAMPLE 4

Asphalt Additive from Synthetic Polyiosprene (IR) Scrap and Polyethylene

In the first stage, the synthetic Polyiosprene scrap was broken down to powder using a refiner mill and mixed in a Banbury with 0.025 parts of Dibenzothiazole disulfide and 0.025 parts of N,N'-diphenyl guanadine of per hundred parts of powdered IR powder for 20 minutes until the temperature reached 100° C.

Stage 1 Composition

| Material | Parts |
| --- | --- |
| Synthetic Polyisoprene | 100 |
| Dibenzothiazole disulphide | 0.025 |
| N,N'-diphenyl guanidine | 0.025 |

The mix was then cooled and aged for 24 hours.

In stage 2, mixture of synthetic polyisoprene and 2,2'-dibenzamidodiphenyldisulfide/N,N'-diphenyl guanidine (peptizers) was mixed with polyethylene in the ratio of 80:20 for 10 minutes in an internal mixer at temperature of 180° C. The mix was then dumped onto to a two roll mill where 5 parts of Styrene Butadiene Rubber (SBR) per hundred on the weight of the dumped mix was milled together to produce a uniform composite of asphalt additive in the form of sheets.

Stage 2 Composition

| Material | Parts |
| --- | --- |
| Mix of Polyisoprene and peptizers from stage 1 | 80 |
| Polyethylene | 20 |
| Polypropylene | 0 |
| After dumping mix on two roll mill, additional component | |
| Styrene Butadiene Rubber (SBR) | 5 |

EXAMPLE 5

Asphalt Additive from Synthetic Polyiosprene (IR) and Butyl Bladder Scraps, and Polyethylene and Polypropylene In the first stage, the synthetic Polyiosprene scrap was broken down to powder using a refiner mill and added to powdered butyl bladder, and mixed in a Banbury with 0.025 parts of Dibenzothiazole disulfide and 0.025 parts of N,N'-diphenyl guanadine per hundred parts of powdered IR and butyl bladder powder for 20 minutes until the temperature reached 230° C.

Stage 1 Composition

| Material | Parts |
| --- | --- |
| Synthetic Polyisoprene and Butyl bladder | 100 |

| Material | Parts |
| --- | --- |
| Dibenzothiazole disulphide | 0.025 |
| N,N'-diphenyl guanidine | 0.025 |

The mix was then cooled and aged for 24 hours.

In stage 2, mixture of synthetic polyisoprene, Butyl bladder and 2,2'-dibenzamidodiphenyldisulfide/N,N'-diphenyl guanadine (peptizers) was mixed with polyethylene and polypropylene in the ratio of 90:2:8 for 10 minutes in an internal mixer at temperature of 230° C. The mix was then dumped onto a two roll mill where 5 parts of Styrene Butadiene Rubber (SBR) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 90 |
| Polyethylene | 2 |
| Polypropylene | 8 |
| After dumping mix on two roll mill, additional component | |
| Styrene Butadiene Rubber (SBR) | 5 |

EXAMPLE 6

Asphalt Additive from Natural Rubber (NR) and Butyl Bladder Scraps, and Polyethylene and Polypropylene In the first stage, the Natural Rubber scrap was broken down to powder using a refiner mill and added to powdered butyl bladder, and mixed in a Banbury with 0.05 parts of 2,2'-dibenzamidodiphenyldisulfide per hundred parts of powdered NR and butyl bladder powder for 20 minutes until the temperature reached 230° C.

Stage 1 Composition

| Material | Parts |
| --- | --- |
| Synthetic Polyisoprene and Butyl bladder | 100 |
| 2,2'-dibenzamidodiphenyldisulfide | 0.05 |

The mix was then cooled and aged for 24 hours.

In stage 2, mixture of NR and Butyl bladder, and 2,2'-dibenzamidodiphenyldisulfide was mixed with polyethylene and polypropylene in the ratio of 90:2:8 respectively for 10 minutes in an internal mixer at temperature of 230° C. The mix was then dumped onto a two roll mill where 10 parts of Styrene Butadiene Styrene block copolymer (SBS) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 90 |
| Polyethylene | 2 |
| Polypropylene | 8 |
| After dumping mix on two roll mill, additional component | |
| Styrene Butadiene Styrene block copolymer (SBS) | 10 |

EXAMPLE 7

Asphalt Additive from Natural Rubber (NR) and Butyl Bladder Scraps, and Polyethylene and Polypropylene In the first stage, the Natural Rubber scrap was broken down to powder using a refiner mill and added to powdered butyl bladder, and mixed in a Banbury with 0.05 parts of 2,2'-dibenzamidodiphenyldisulfide per hundred parts of powdered NR and butyl bladder powder for 20 minutes until the temperature reached 230° C.

Stage 1 Composition

| Material | Parts |
| --- | --- |
| Synthetic Polyisoprene and Butyl bladder | 100 |
| 2,2'-dibenzamidodiphenyldisulfide | 0.05 |

The mix was then cooled and aged for 24 hours.

In stage 2, mixture of NR and Butyl bladder, and 2,2'-dibenzamidodiphenyldisulfide was mixed with polyethylene and polypropylene in the ratio of 80:5:15 respectively for 10 minutes in an internal mixer at temperature of 230° C. The mix was then dumped onto a two roll mill where 10 parts of synthetic Polyisoprene (IR) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 80 |
| Polyethylene | 5 |
| Polypropylene | 15 |
| After dumping mix on two roll mill, additional component | |
| Synthetic Polyisoprene | 10 |

EXAMPLE 8

Asphalt Additive from Synthetic Polyiosprene (IR) and Butyl Bladder Scraps, and Polyethylene and Polypropylene In the first stage, the synthetic Polyiosprene scrap was broken down to powder using a refiner mill and added to powdered butyl bladder, and mixed in a Banbury with 0.025 parts of Dibenzothiazole disulfide and 0.025 parts of N,N'-diphenyl guanadine per hundred parts of powdered IR and butyl bladder powder for 20 minutes until the temperature reached 230° C.

Stage 1 Composition

| Material | Parts |
| --- | --- |
| Synthetic Polyisoprene and Butyl bladder | 100 |
| Dibenzothiazole disulphide | 0.025 |
| N,N'-diphenyl guanadine | 0.025 |

The mix was then cooled and aged for 24 hours.

In stage 2, mixture of synthetic polyisoprene, Butyl bladder and 2,2'-dibenzamidodiphenyldisulfide/N,N'-diphenyl guanadine (peptizers) was mixed with polyethylene and polypropylene in the ratio of 80:5:15 respectively for 10 minutes in an internal mixer at temperature of 230° C. The mix was then dumped onto a two roll mill where 20 parts of Natural Rubber (NR) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 80 |
| Polyethylene | 5 |
| Polypropylene | 15 |
| After dumping mix on two roll mill, additional component | |
| Natural Rubber (NR) | 20 |

EXAMPLE 9

Asphalt Additive from Synthetic Polyiosprene (IR), Natural Rubber and Butyl Bladder Scraps, and Polyethylene and Polypropylene In the first stage, the synthetic Polyiosprene and Natural Rubber scraps were broken down to powder using a refiner mill and added to powdered butyl bladder, and mixed in a Banbury with 0.025 parts of Dibenzothiazole disulfide and 0.025 parts of N,N'-diphenyl guanadine per hundred parts of powdered IR, NR and butyl bladder powder for 20 minutes until the temperature reached 210° C.

Stage 1 Composition

| Material | Parts |
| --- | --- |
| IR, NR and Butyl powders in 20:20:40 ratio | 100 |
| Dibenzothiazole disulphide | 0.025 |
| N,N'-diphenyl guanadine | 0.025 |

The mix was then cooled and aged for 24 hours.

In stage 2, mixture of synthetic polyisoprene (IR), Natural Rubber (NR), Butyl bladder and 2,2'-dibenzamidodiphenyldisulfide/N,N'-diphenyl guanadine (Peptizers) was mixed with polyethylene and polypropylene in the ratio of 80:5:15 respectively for 8 minutes in an internal mixer at temperature of 230° C. Further mixing for 2 minutes was continued with addition of 5 parts of blown bitumen to 100 parts of the IR, NR, Bladder and peptizers mix in the internal mixer. The mix was then dumped onto a two roll mill where 20 parts of Natural Rubber (NR) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 80 |
| Polyethylene | 5 |
| Polypropylene | 15 |
| After dumping mix on two roll mill, additional component | |
| Styrene Butadiene Rubber (SBR) | 20 |

EXAMPLE 10

Asphalt Additive from Synthetic Polyiosprene (IR), Natural Rubber and Butyl Bladder Scraps, and Polyethylene and Polypropylene In the first stage, the synthetic Polyiosprene and Natural Rubber scraps were broken down to powder using a refiner mill and added to powdered butyl bladder, and mixed in a Banbury with 0.025 parts of Dibenzothiazole disulfide and 0.025 parts of N,N'-diphenyl guanadine per hundred parts of powdered IR, NR and butyl bladder powder for 20 minutes until the temperature reached 210° C.

Stage 1 Composition

| Material | Parts |
| --- | --- |
| IR, NR and Butyl powders in 20:20:40 ratio | 100 |
| Dibenzothiazole disulphide | 0.025 |
| N,N'-diphenyl guanadine | 0.025 |

The mix was then cooled and aged for 24 hours.

In stage 2, mixture of synthetic polyisoprene (IR), Natural Rubber (NR), Butyl bladder and 2,2'-dibenzamidodiphenyldisulfide/N,N'-diphenyl guanadine (peptizers) was mixed with polyethylene and polypropylene in the ratio of 80:5:15 respectively for 8 minutes in an internal mixer at temperature of 230° C. Further mixing for 2 minutes was continued with addition of 10 parts of blown bitumen to 100 parts of the IR, NR, Bladder and peptizers mix in the internal mixer. The mix was then dumped onto a two roll mill where 20 parts of Natural Rubber (NR) per hundred on the weight of the dumped mix was milled together to produce a uniform composite of asphalt additive in the form of sheets.

Stage 2 Composition

| Material | Parts |
| --- | --- |
| Mix of Polyisoprene, Butyl bladder and peptizers from stage 1 | 80 |
| Polyethylene | 5 |
| Polypropylene | 15 |
| Blown Bitumen | 10 |
| After dumping mix on two roll mill, additional component | |
| Natural Rubber (NR) | 20 |

EXAMPLE 11

Asphalt Additive from Synthetic Polyiosprene (IR), Natural Rubber and Butyl Bladder Scraps, and Polyethylene and Polypropylene In the first stage, the synthetic Polyiosprene and Natural Rubber scraps were broken down to powder using a refiner mill and added to powdered butyl bladder, and mixed in a Banbury with 0.025 parts of Dibenzothiazole disulfide and 0.025 parts of N,N'-diphenyl guanadine per hundred parts of powdered IR, NR and butyl bladder powder for 20 minutes until the temperature reached 210° C.

Stage 1 Composition

| Material | Parts |
|---|---|
| IR, NR and Butyl powders in 20:20:40 ratio | 100 |
| Dibenzothiazole disulphide | 0.025 |
| N,N'-diphenyl guanidine | 0.025 |

The mix was then cooled and aged for 24 hours.

In stage 2, mixture of synthetic polyisoprene (IR), Natural Rubber (NR), Butyl bladder and 2,2'-dibenzamidodiphenyldisulfide/N,N'-diphenyl guanadine (peptizers) was mixed with polyethylene and polypropylene in the ratio of 80:5:15 respectively for 8 minutes in an internal mixer at temperature of 230° C. Further mixing for 2 minutes was continued with addition of 10 parts of blown bitumen and 10 parts of Styrene Butadiene Styrene block copolymer (SBS) to 100 parts of the NR, Bladder and peptizers mix in the internal mixer. The mix was then dumped onto a two roll mill and milled for 5 minutes to produce a uniform composite of asphalt additive in the form of sheets.

Stage 2 Composition

| Material | Parts |
|---|---|
| Mix of Polyisoprene, Butyl bladder and peptizers from stage 1 | 80 |
| Polyethylene | 5 |
| Polypropylene | 15 |
| Blown Bitumen | 10 |
| Styrene Butadiene Styrene block copolymer (SBS) | 10 |

While particular embodiments of the invention have been described, it would be understood, of course, that the invention is not limited thereto, and that many obvious modifications and variations can be made, and that such modifications and variations are intended to fall within the scope of the appended claims.

The invention claimed is:

1. A process for the manufacture of a polymer/bitumen composite for enhancing desirable properties of asphalt comprising the steps of:
   a. providing a blend of rubber feedstock comprising at least 30% butyl rubber polyisoprene powder from used butyl bladders and powdered polyisoprene from any one of waste elastic bands, rubber bands and/or rubber thread manufacture;
   b. mixing the rubber feedstock of butyl rubber, polyisoprene powder, and powdered polyisoprene wastes with a peptizing agent in doses ranging from 0.01 to 0.15 parts per hundred of the weight of the rubber feedstock of butyl rubber, polyisoprene powder, and powdered polyisoprene wastes in an internal mixer (Banbury) at 70° C. to 230° C., cooling the mixture, then transferring into another enclosed chamber with rotors (Internal Mixer);
   c. and heating the mixture with a blend of bitumen, polyethylene and polypropylene at 5% to 50% of the weight of the butyl rubber polyisoprene powder mixture, in the enclosed chamber at temperature range of 160° C. to 320° C. for a period of 3 to 120 minutes to produce the rubber/bitumen/plastic mixture, then dropping onto a dump mill at the bottom of the Internal Mixer;
   d. and further mixing 5 to 25 parts per hundred parts of the said rubber/bitumen/plastic mixture a virgin polymer for the purpose of creating material that can be sheeted out on rubber dump mills; the virgin polymer selected from the group consisting of Styrene Butadiene Rubber (SBR), Natural Rubber (NR), synthetic Polyisoprene (IR) and Styrene Butadiene Copolymer (SBS).

2. The process of claim 1 wherein the peptizing agent comprises 0.01% to 0.15% of activated 2,2'-dibenzamido diphenyl disulfide.

3. The process of claim 1 wherein the peptizing agent comprises 0.01% to 0.15% Dibenzothiazole disulphide.

4. The process of claim 1 wherein the peptizing agent comprises 0.01% to 0.15% N,N'-diphenyl guanadine.

5. The process of claim 1 wherein the peptizing agent comprises 0.01% to 0.15% of chemical additives selected from the group consisting of activated 2,2'-dibenzamido-diphenyldisulfide, Dibenzothiazole disulphide and N,N'-diphenyl guanadine and or mixtures thereof.

6. The process of claim 1 wherein the polyethylene and polypropylene also comprises post-consumer recycled plastic scraps.

7. The process of claim 1 wherein the polyethylene and polypropylene also comprise virgin plastics resins.

8. The process of claim 1 wherein the bitumen also comprises Asphalt from natural sources and from petroleum refining process.

9. The process of claim 1 wherein the bitumen also comprises Asphalt having a specific gravity of 0.9 to 1.15, flash point of above 320° C., and softening point of 50° C. to 125° C. with solubility in Trichloehtylene at more than 995%.

10. The process of claim 5 wherein the bitumen is derivative of Petroleum refining or natural resources.

* * * * *